United States Patent [19]

Hulse

[11] Patent Number: 5,540,318
[45] Date of Patent: Jul. 30, 1996

[54] METHOD AND APPARATUS FOR GLAZING CERAMIC WARE

[75] Inventor: David K. Hulse, Stoke-on-Trent, England

[73] Assignee: Royal Doulton (UK) Limited, Stoke-on-Trent, England

[21] Appl. No.: 407,969

[22] Filed: Mar. 22, 1995

[30] Foreign Application Priority Data

Mar. 24, 1994 [GB] United Kingdom .............. 9405823

[51] Int. Cl.$^6$ ............................................. B65G 47/248
[52] U.S. Cl. .................................................. 198/405
[58] Field of Search ...................................... 198/404, 405,
198/417; 118/110, 112, 114, 322, 416, 731

[56] References Cited

U.S. PATENT DOCUMENTS

| | | | |
|---|---|---|---|
| 3,729,189 | 4/1973 | Watson | 198/405 X |
| 3,838,771 | 10/1974 | Whiteford | 198/405 X |
| 4,685,553 | 8/1987 | Jennings | 198/405 |
| 4,867,099 | 9/1989 | Heine et al. | 198/405 X |

FOREIGN PATENT DOCUMENTS

| | | | |
|---|---|---|---|
| 0282111 | 11/1990 | Japan | 198/405 |
| 0524635 | 2/1993 | Japan | 198/405 |
| 818684 | 10/1956 | United Kingdom . | |
| 2056397 | 5/1980 | United Kingdom . | |

*Primary Examiner*—James R. Bidwell
*Attorney, Agent, or Firm*—Watts, Hoffmann, Fisher & Heinke Co., L.P.A.

[57] ABSTRACT

A method and apparatus for use in glazing an article of ceramic flatware or holloware comprises first glazing the undersurface of the article, then turning the article and then glazing the upper surface. Turning is preferably effected by a turning device including upper and lower conveyor members, one of which is adapted to contact the foot of the article and the other the rim of the article, the conveyor members being rotated through 180° while gripping the article and then being moved apart to release the article in the turned position supported on the conveyor member which is then in the lower position.

13 Claims, 2 Drawing Sheets

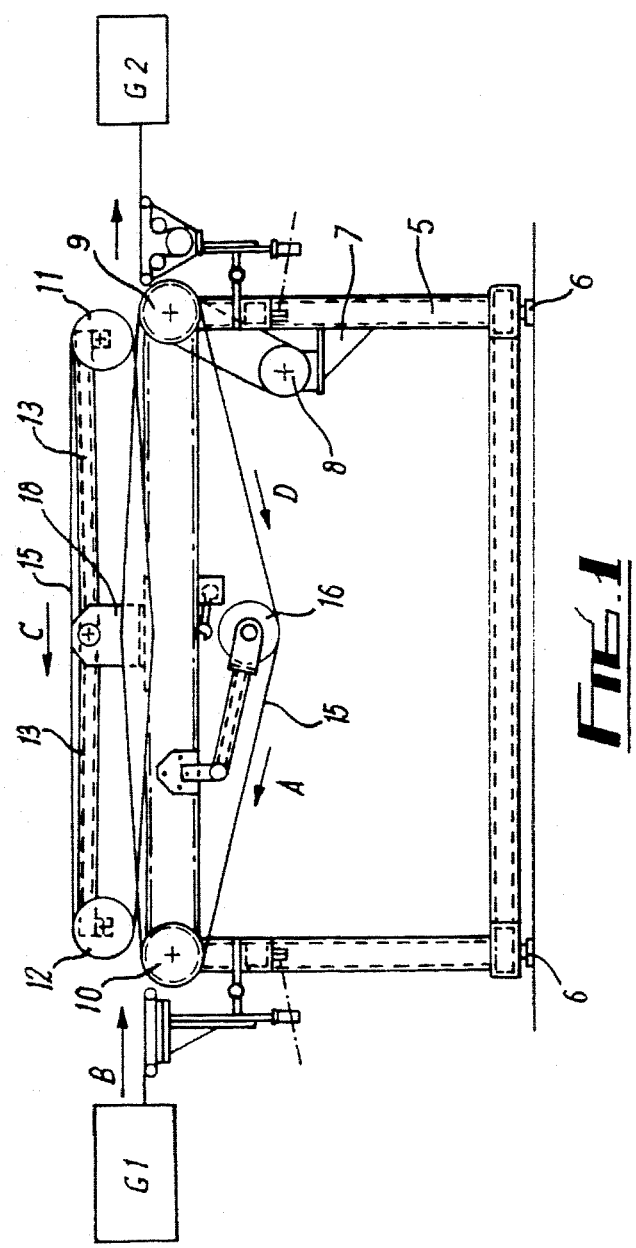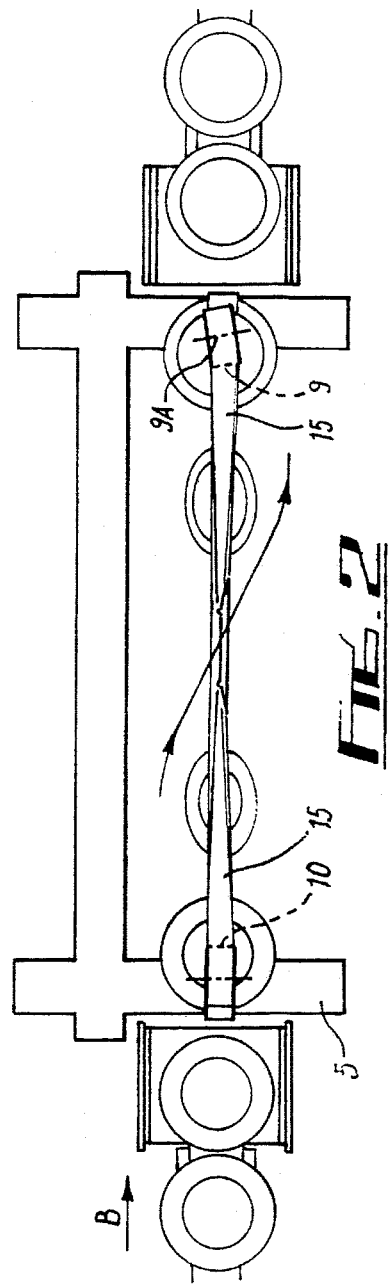

METHOD AND APPARATUS FOR GLAZING CERAMIC WARE

This invention relates to apparatus for use glazing ceramic articles such as plates or the like Ceramic articles such as plates, saucers and the like which are glazed on their upper and lower surfaces require to be turned during the glazing process to enable glaze to be applied to each surface in turn. In general the undersurface of such articles is glazed first and they are then turned on to their base or "foot" and the upper surface subsequently glazed. Hitherto turning of such articles has been effected by hand and it is an object of the present invention to provide an automatic means of turning such articles in the course of glazing operations.

According to one aspect of the invention there is provided a method of turning an article of ceramic flatware or holloware comprising gripping the foot and rim of the article and rotating same through 180° to turn the article.

The invention also provides apparatus for use in turning an article of ceramic flatware or holloware comprising means for gripping the foot and rim of the article, means for turning the gripped article through 180° and means for releasing the article in the turned position.

Preferably said means for gripping the article comprises upper and lower conveyor members, one of which is adapted to contact the foot of the article and the other the rim of the article, the conveyor members being rotated through 180° while gripping the article and then being moved apart to release the article in the turned position supported on the conveyor member which is then in the lower position.

The conveyor members preferably comprise adjacent runs of a single conveyor entrained over upper and lower sets of guide members, each of said runs moving from one to the other set of guide members following said rotation.

Preferably means is provided to vary the distance between said adjacent runs of the conveyor to adapt the apparatus for handling of different articles.

An embodiment of the invention will now be described, by way of example only, with reference to the accompanying drawings, in which:

FIG. 1 is a side elevation of one form of apparatus according to the invention;

FIG. 2 is a plan view of the apparatus shown in FIG. 1 with the upper section of the belt omitted for clarity.

Figure 3:
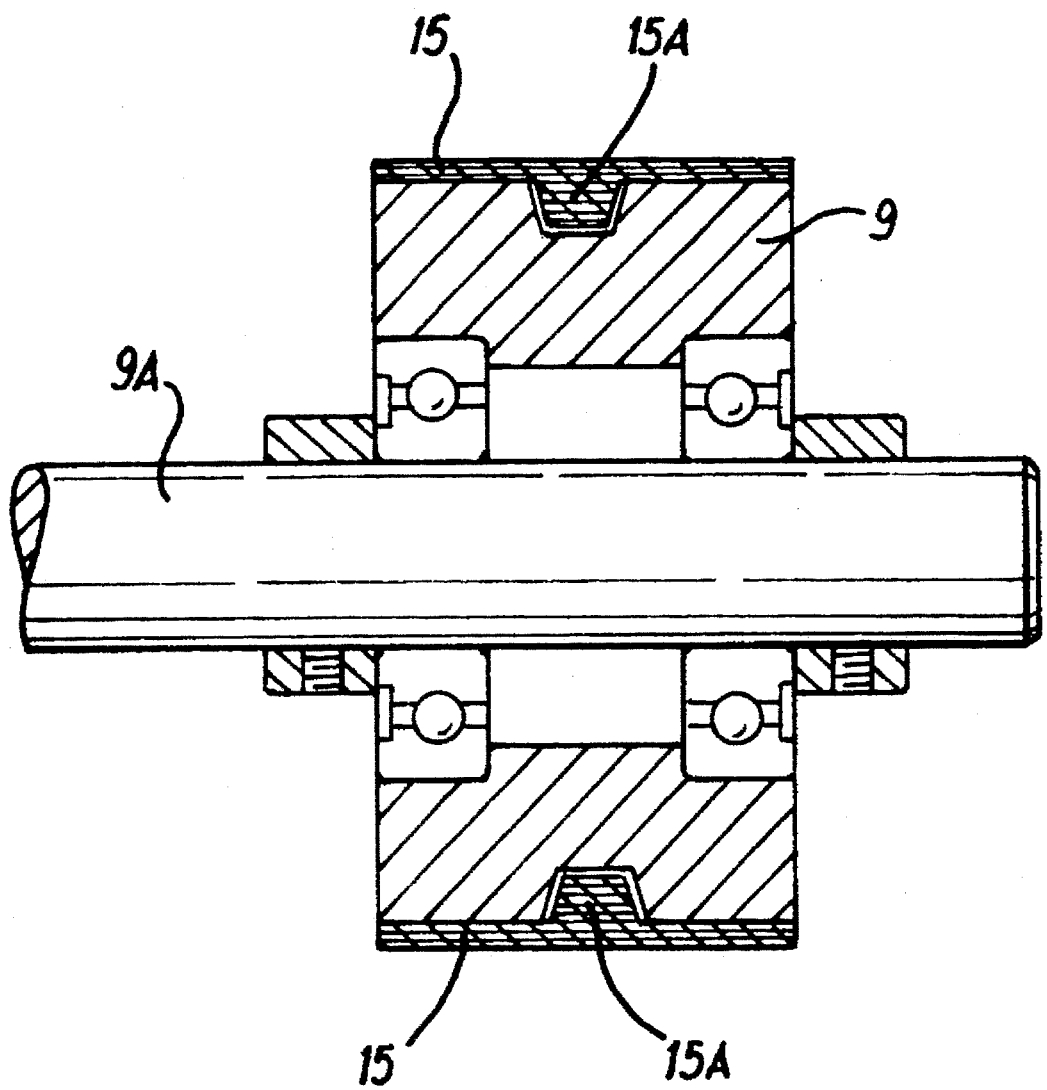
FIG. 3 is a cross-section through a roller incorporated in the apparatus of FIGS. 1 and 2.

Referring to the drawings, the apparatus comprises a frame 5 supported on adjustable feet 6 and provided with a bracket 7 on which a drive motor 8 is supported. A drive roller 9 is rotatably mounted on the frame 5 and operatively connected to the motor 8. A lower idler roller 10 is rotatably mounted on the frame 5 and a pair of upper idler rollers 11 and 12 are rotatably mounted on arms 13 in positions above the drive roller 9 and idler roller 10.

A conveyor member in the form of a belt 15 is entrained round the drive and idler rollers and around a tensioning roller 16. From the roller 16 the belt moves in the direction of arrow 'A' to the idler roller 10. It then travels in the direction of arrow 'B' towards the right hand end of the machine as shown in the drawings. During this travel the belt is rotated through 180° and is then entrained round the idler roller 11 and travels in the direction of arrow 'C' to the idler roller 12. After travelling round the roller 12 the belt again travels in the direction of arrow 'B' in a position above and spaced from the section of the belt leaving the roller 10. The section leaving roller 12 is then rotated through 180°, entrained round the drive roller 9 and returns in the direction of arrow 'D' to the tensioning roller 16.

Thus two sections of the belt travel in the same direction between the rollers 10,12 and 9,11 and are rotated through 180° in the same direction so that they remain parallel to one another, but the section which is uppermost when leaving the roller 12 is lowermost when it reaches the roller 9 and the section which is lowermost when leaving the roller 10 becomes uppermost when it reaches the roller 11.

In use of the apparatus, plates or other articles of flatware are delivered to the apparatus from the left in the direction of arrow 'B' on to the upper surface of the lower section of the belt. On delivery the plate is in an inverted position so that the rim of the plate is supported on the upper surface of the lower section of the belt. The under surface of the upper section of the belt 15 then moves into contact with the foot of the plate and as the plate moves from left to right the belts twist through 180° thereby turning the plate to an upright position. Towards the discharge or right hand end of the apparatus the then upper and lower sections of the belt move apart thereby leaving the plate supported by its foot on the upper surface of the lower section of the belt from which it is discharged to the right of the apparatus for further processing.

It will be appreciated that the belt contacts the plate only at four zones, that is at diametrically opposed zones on the foot and at diametrically opposed zones on the rim. This will result in removal of some glaze from the foot but the foot is subsequently wiped clear of glaze in any event and hence removal of glaze from the foot during turning of the plate is not detrimental. With regard to the rim, the belt will contact the upper surface of the plate adjacent the rim, but only the underside of the plate has been glazed in a glazing unit indicated diagrammatically at G1 of FIG. 1 when turning takes place and hence there is no interference with the glazed underside of the rim and glazing of the upper surface is effected subsequently in a glazing unit indicated diagrammatically at G2 of FIG. 1 after the turned plate has been discharged from the apparatus.

To enable adjustment of the apparatus to handle different articles, such as saucers or bowls, the arms 13 on which the idler rollers 11 and 12 are mounted are pivotally connected to a fixed support 18 and may be angularly adjusted to raise or lower the rollers 11 and 12 relative to the rollers 9 and 10. This alters the distance between the adjacent belt sections which grip the articles to suit articles of different depth. To assist in tracking of the belts, the rollers 9–12 are each provided with a central groove 19 (FIG. 3) engaged by a projecting rib 15A on the undersurface of the belt. The axis 9A of the drive roller 9 is also inclined relative to the normal to the direction of belt movement to further resist the tendancy of the belt to disengage from the rollers.

The arrangement described enables automatic turning of partly glazed plates or other articles of flat or holloware in a simple and effective manner. By gripping the article only in the region of the rim and foot, undesirable interference with already glazed areas is avoided. Moreover the operation is more consistent in handling and less liable to dropping and breakage than in the case of manual turning as has been practised hitherto.

Various modifications may be made without departing from the invention. For example the belts may be provided with a variety of alternative surfaces to contact the ware and alternative means of driving the belts and of delivering and discharging the ware to and from the apparatus may be employed. Conveyor members other than belts may be employed as may other means of gripping the articles by the rim and foot and turning them through 180°.

Whilst endeavouring in the foregoing specification to draw attention to those features of the invention believed to be of particular importance it should be understood that the Applicant claims protection in respect of any patentable feature or combination of features hereinbefore referred to and/or shown in the drawings whether or not particular emphasis has been placed thereon.

I claim:

1. A method of glazing the upper and lower surfaces of an article of dished ceramic flatware or holloware having an upper surface and a projecting foot on the underside of the article, the method comprising applying a glaze medium to the undersurface of the article, gripping the foot and an unglazed portion of the upper surface of the article, turning the article through 180° and applying a glaze medium to the upper surface of the article after turning.

2. A method according to claim 1 in which glaze medium is subsequently wiped from the foot of the article.

3. A method according to claim 1 wherein the portion of the upper surface is an outer rim of the article.

4. A method according to claim 3 wherein turning of the article is effected by bringing together upper and lower conveyor members to grip the article by contacting the foot and the rim of the article respectively, rotating the conveyor members with the article gripped between them through 180°, and moving the conveyor members apart to release the article in the turned position and leave it supported on the conveyor member which is then in the lower position.

5. Apparatus for use in glazing the upper and lower surfaces of an article of dished ceramic flatware or holloware having an upper surface and a projecting foot on the underside of the article, the apparatus comprising means for applying a glaze medium to the undersurface of the article, means for gripping the foot and an unglazed portion of the upper surface of the article, means for turning the gripped article through 180°, means for releasing the article in the turned position, and means for applying a glaze medium to the upper surface of the article after turning.

6. Apparatus according to claim 5 wherein means is provided for removing glaze from the foot of the article after both surfaces of the article have been glazed.

7. Apparatus according to claim 5 wherein said means for gripping the article comprises upper and lower conveyor members, one of which is adapted to contact the foot of the article and the other an unglazed rim of the article, the conveyor members when in use being rotated through 180° while gripping the article and then being moved apart to release the article in the turned position supported on the conveyor member which is then in the lower position.

8. Apparatus according to claim 7 wherein said conveyor members comprise adjacent runs of a single conveyor entrained over upper and lower sets of guide members, each of said runs when in use moving from one to the other set of guide members following said rotation.

9. Apparatus according to claim 8 including means to vary the distance between said adjacent runs of the conveyor to adapt the apparatus for handling of different articles.

10. Apparatus according to claim 8 wherein said upper set of guide members are mounted on support arms pivotally connected to a common support member and angularly movable relative thereto to move said upper set of guide members towards or away from said lower set of guide members.

11. Apparatus according to claim 8 wherein said conveyor is an endless belt and said guide members comprise rollers each of which is provided with a central groove engaged by a projecting rib on the adjacent surface of the belt.

12. Apparatus according to claim 8 wherein said guide members include a driven guide member and a plurality of idler guide members, the axis of rotation of at least the driven guide member being disposed in a plane extending parallel to the surface of the belt supported thereon and being inclined to the direction of conveyor movement whereby to counter the tendency of the conveyor to disengage from the guide members.

13. Apparatus for use in turning an article of ceramic flatware or holloware having a foot and a rim comprising:
  a) gripping means for gripping the foot and rim of such article;
  b) turning means for turning such gripped article through 180°;
  c) releasing means for releasing the article in the turned position;
  d) said gripping means comprising upper and lower conveyor members, one of which is adapted to contact the foot of such article and the other the rim of such article, the conveyor members being rotated through 180° while gripping the article and then being moved apart to release the article in the turned position supported on the conveyor member which is then in the lower position;
  e) said conveyor members further comprising adjacent runs of a single conveyor belt entrained over upper and lower sets of guide members, each of said runs moving from one to the other set of guide members following said rotation;
  f) adjustment means to vary the distance between said adjacent runs of the conveyor to adapt the apparatus for handling of different articles; and,
  g) said upper set of guide members being mounted on support arms pivotally connected to a common support member and angularly movable relative the support member to move said upper set of guide members toward or away from said lower set of guide members.

* * * * *